(12) United States Patent
Kim

(10) Patent No.: US 11,903,453 B2
(45) Date of Patent: Feb. 20, 2024

(54) SYSTEM FOR PROVIDING USER-CUSTOMIZED LAST AND METHOD THEREFOR

(71) Applicant: Il Soo Kim, Yongin-si (KR)

(72) Inventor: Il Soo Kim, Yongin-si (KR)

(*) Notice: Subject to any disclaimer, the term of this patent is extended or adjusted under 35 U.S.C. 154(b) by 959 days.

(21) Appl. No.: 16/868,689

(22) Filed: May 7, 2020

(65) Prior Publication Data

US 2020/0275742 A1 Sep. 3, 2020

Related U.S. Application Data

(63) Continuation of application No. PCT/KR2018/013437, filed on Nov. 7, 2018.

(30) Foreign Application Priority Data

Nov. 7, 2017 (KR) .................. 10-2017-0147512

(51) Int. Cl.
 *A43D 1/02* (2006.01)
 *A43D 1/04* (2006.01)
(52) U.S. Cl.
 CPC .............. *A43D 1/027* (2013.01); *A43D 1/04* (2013.01)
(58) Field of Classification Search
 CPC .................................. A61B 5/30; A43D 1/04
 USPC ..................... 33/3 A, 3 B, 3 C, 512
 See application file for complete search history.

(56) References Cited

U.S. PATENT DOCUMENTS

| | | | |
|---|---|---|---|
| 2,312,410 A | 3/1943 | Hewitt, Jr. | |
| 4,807,368 A * | 2/1989 | Beyl | B62M 3/086 36/131 |
| 4,876,758 A * | 10/1989 | Rolloff | A43D 1/02 600/592 |
| 7,582,064 B2 * | 9/2009 | Martindale | A61B 5/1036 600/592 |
| 7,685,728 B2 * | 3/2010 | Goonetilleke | A61B 5/1074 600/595 |
| 7,854,071 B2 * | 12/2010 | Goonetilleke | A43D 1/02 33/3 R |
| 8,290,739 B2 * | 10/2012 | Tadin | A61B 5/1036 600/595 |
| 10,827,798 B2 * | 11/2020 | Piontkowski | A43B 1/0054 |
| 2005/0097762 A1 * | 5/2005 | Biesbrouck | A61B 5/1036 33/3 R |
| 2014/0360033 A1 * | 12/2014 | Miller | A43D 1/02 33/515 |
| 2015/0268037 A1 | 9/2015 | Cook et al. | |

(Continued)

FOREIGN PATENT DOCUMENTS

| | | |
|---|---|---|
| DE | 10102492 | 8/2002 |
| DE | 102014109388 | 1/2016 |

(Continued)

OTHER PUBLICATIONS

EPO, European Search Report of EP18876212.4 dated Jun. 18, 2021.

*Primary Examiner* — George B Bennett
(74) *Attorney, Agent, or Firm* — LEX IP MEISTER, PLLC

(57) ABSTRACT

The present invention discloses a tilting controller that measures foot-related human biomechanical data. The tilting controller for measuring foot-related human biomechanical data includes a mechanism having a foot hold on which a rear foot portion is placed, and a control module that tilts the foot hold by controlling the mechanism portion.

9 Claims, 22 Drawing Sheets

(56) References Cited

U.S. PATENT DOCUMENTS

| | | | |
|---|---|---|---|
| 2015/0351493 A1 | 12/2015 | Ashcroft et al. | |
| 2016/0015124 A1* | 1/2016 | Grell | A43B 13/181 36/102 |
| 2016/0239014 A1 | 8/2016 | Piontkowski | |
| 2022/0312895 A1* | 10/2022 | Kozuka | A43B 23/042 |

FOREIGN PATENT DOCUMENTS

| | | |
|---|---|---|
| GB | 112959 | 2/1918 |
| JP | 2002-136632 | 5/2002 |
| JP | 2006-262917 | 10/2006 |
| JP | 2008-104667 | 5/2008 |
| KR | 1020090027039 | 3/2009 |
| KR | 10-2013-0058442 | 6/2013 |
| KR | 10-2013-0134680 | 12/2013 |
| KR | 10-2017-0050230 | 5/2017 |
| KR | 1020170053353 | 5/2017 |
| KR | 10-2017-0060736 | 6/2017 |
| KR | 10-2017-0116774 | 10/2017 |

* cited by examiner

FIG. 12

| NAME | BIRTHDAY | HEIGHT | WEIGHT | FOOT DISEASE | FOOT LENGTH | FOOT WIDTH | FOOT ARCH 1 | FOOT ARCH 2 |
|------|----------|--------|--------|--------------|-------------|------------|-------------|-------------|
|      |          |        |        |              |             |            |             |             |
|      |          |        |        |              |             |            |             |             |

<User information table(User Info TABLE)>

| NAME | BIRTHDAY | FOOT FORE PRESSURE 0 | FOOT FORE PRESSURE 159 | ... | FOOT HEEL CORD PRESSURE 0 | FOOT HEEL CORD PRESSURE 15 | ... | ELECTR OMYOG RAM | FOOT OMYOG RAM 7 | PARTICIPANT FOOT COMFORTABLE | PARTICIPANT FOOT SLIPPING |
|------|----------|----------------------|------------------------|-----|---------------------------|----------------------------|-----|------------------|------------------|------------------------------|---------------------------|
|      |          |                      |                        |     |                           |                            |     |                  |                  |                              |                           |
|      |          |                      |                        |     |                           |                            |     |                  |                  |                              |                           |
|      |          |                      |                        |     |                           |                            |     |                  |                  |                              |                           |

<User data (sensing_EMG) table(User Data TABLE)>

SYSTEM FOR PROVIDING USER-CUSTOMIZED LAST AND METHOD THEREFOR

CROSS-REFERENCE TO RELATED APPLICATION

This application claims priority to and the benefit of Korean Patent Application No. 10-2017-0147512 filed in the Korean Intellectual Property Office on Nov. 7, 2017, the entire contents of which are incorporated herein by reference.

BACKGROUND OF THE INVENTION

(a) Field of the Invention

The present invention relates to a tilting controller that can provide foot-related human biomechanical data for determination of wearing comfort of footwear according to a foot shape of a user, and data of acquire foot-related human biomechanical data such as a foot pressure, a foot length, a width of a foot ball, a height of the top of the foot by changing a tilting condition.

(b) Description of the Related Art

In general, footwear refers to an object worn by a person (hereinafter referred to as a user) on the foot, and various types of footwear such as shoes, high-heeled footwear, sneakers, hiking boots, industrialization and functional rehabilitation footwear, and the like have been produced.

Typically, a user purchases preferred footwear considering factors such as wearing comfort, design, use, a brand, and the like.

Among them, the wearing comfort is felt when wearing footwear, and the user purchases footwear to fit the size, and basically, the user does not purchase footwear that does not fit even if other elements are satisfied. Here, the wearing comfort includes not only a size in a foot length direction (size), but also a foot ball width, a height of the top of the foot height, weight distribution (absorption), stability, and walking comfort. Therefore, when the footwear fits comfortably on the foot, it is expressed that the wearing comfort is good.

On the other hand, when the size of the footwear does not match or when at least one of the remaining elements constituting the wearing comfort does not match the user's foot even if the size is correct, the wearing comfort may not be good. In this case, footwear that does not fit comfortably may increase user fatigue and may cause negative effects, such as body damage/deformation and the like.

For example, in the case of high-heeled footwear, the heel is high so that the user's weight does not disperse and it is directed toward the front of the foot.

Moreover, when the wearing comfort of high-heeled footwear is not good, it causes various side effects because it cannot absorb or disperse the weight during the user's walking cycle.

For example, not only a simple accident of falling while walking, but also hallux valgus with an outward flexion of a big toe, ankle sprain, arthritis caused by the body weight being pulled inside the knee, and scoliosis with the spine bending backward may occur.

In addition, recently, trends in which a height elevator is applied to heels of various footwear other than the high-heeled footwear have been seen, thereby causing the above-mentioned problems and side effects.

Meanwhile, the sale of footwear is active not only in offline stores, but also through online stores, and for example, online users such as overseas direct purchases can't wear footwear directly, so they purchase it by referring to the uniform size.

However, even if the size is the same, there is a deviation in the size of the footwear due to deviations from manufacturer to manufacturer, and there is a drawback of wearing footwear at the expense of inconvenience because it is difficult to exchange even if the elements other than size do not fit and the wearing comfort is not good.

In addition, this leads to the problem of the user's fatigue pointed out above, accidents during walking, and deformation of the body.

Accordingly, in manufacturing footwear, considering various foot shapes, footwear with good wearing comfort is provided, and a method for a user to select footwear with good wearing comfort for their feet is urgently required.

The above information disclosed in this Background section is only for enhancement of understanding of the background of the invention, and therefore it may contain information that does not form the prior art that is already known in this country to a person of ordinary skill in the art.

SUMMARY OF THE INVENTION

An exemplary embodiment of the present invention provides a tilting controller that acquires data of foot-related human biomechanical data that matches user's foot shape by collecting qualitative data according to various body conditions and foot shapes of a subject and quantifying it through machine learning.

In addition, another object of the present invention is to provide a tilting controller that enables a user to purchase footwear with improved comfort through an online store without having to try on footwear directly by providing customized last information.

In addition, another object of the present invention is to provide a tilting controller that can acquire foot-related human biomechanical data.

A user-customized last providing system according to one aspect of the present invention includes: a tilting controller that measures foot pressure data applied to a sole according to a tilting condition while a subjects stands thereupon; and a server that generates accumulated raw data by collecting qualitative data according to physical conditions of various subjects and foot pressure data measurement from the tilting controller, extracts quantitative data of an optimized tilting condition according to a foot shape through machine learning by utilizing the raw data, and provides last information generated based on quantitative data that matches foot-related human biomechanical data of the user.

In addition, the tilting controller may measure the foot pressure data of which left/right tilting and front/rear tilting of a front feet portion, left/right tilting and front/rear tilting of a rear foot portion, and a rotation condition are different, while stepwise controlling a height of a heel of the rear foot portion of the foot of the subject.

In addition, the tilting controller may include: a first mechanism portion where a first pressure sensor is disposed in a first foothold where a front feet portion of the foot of the subject is mounted; a second mechanism portion where a second pressure sensor is disposed in a second foothold where a rear foot portion of the foot of the subject is mounted; and a control module 130 that controls operation of each portion for measurement of foot pressure data of the subject.

In addition, the first mechanism portion may tilt the first foothold in front/rear and left/right directions by using two motors and first support shafts formed in lower left and right portions of the first foothold.

In addition, the second mechanism portion may tilt the second foothold in front/rear and left/right directions by using two motors and second support shafts formed in lower left and right portions of the second foothold, and the second mechanism portion may include a height adjusting motor that adjusts a height of a heel by vertically moving the second foothold and a rotation motor that horizontally rotates the second foothold.

In addition, the control module may set a tilting condition according to a foot pressure measurement algorithm by being connected with a plurality of tilting controllers arranged in parallel with each other and then may extract the foot pressure data at time that the left foot weight and the right foot weight are balanced.

In addition, the control module may measure EMG data from an EMG sensor at the time that the left foot weight and the right foot weight are balanced.

In addition, the server may include: a data collector that collects qualitative data that includes foot pressure data, EMG data, and subject satisfaction data for each tilting condition for each subject's heel height from the tilting controller and EMG sensor; a data processor that generates quantitative data of tilting conditions in which comfort according to a foot shape is optimized by performing machine learning based on the qualitative data; a controller that generates 3D last information in consideration of various foot-related physical conditions based on the quantitative data; and a database that stores the qualitative data and the quantitative data, and stores the 3D last information optimized according to stored information.

In addition, the data collector may generate raw data that includes user information data formed of personal information and foot-related human biomechanical data of a subject and a user data table formed of the foot pressure data, EMG data, and subject's foot comfort satisfaction data.

In addition, the data collector may calculate at least one of a foot pressure sum, a foot pressure average, a foot pressure standard deviation, a number of pressure sensors (cells) for which foot pressure is measured, and foot pressure ratios of the front foot portion mechanism and the rear foot portion mechanism from foot pressure data from the foot pressure data and then may add the calculated one to the raw data.

In addition, the data processor may extract at least one input parameter from a tilting condition for each heel height, a foot pressure sum, a foot pressure average, a foot pressure standard deviation, a number of pressure sensors (cells) for measuring foot pressure, a foot pressure ratio of the front foot portion mechanism and the rear foot portion mechanism, EMG similarity (similarity to flat-level EMG), foot comfort satisfaction, and a degree of foot tilt, and may input the extracted input parameter to a machine learning engine.

In addition, a weight value may be assigned for each input parameter according to importance.

In addition, the controller may acquire the foot-related human biomechanical data including at least one of a foot straight line length, a ball width of the foot, a height of the top of the foot, medial and lateral longitudinal arches, and a straight line length of the ball of the foot by analyzing the flat and side image of the foot collected from a user terminal through image processing.

In addition, the controller may derive tilting values of a front foot portion and a rear foot portion corresponding to a desired heel height in consideration of the foot-related human biomechanical data of the user, and the last information according to the tilting value.

In addition, the controller may out an actual last through 3D printing using the 3D last information.

A method for offering user-customized last information according to a feet shape of a user by a server according to one aspect to the present invention, include: a) generating raw data by accumulating qualitative data that matches subject's personal information, foot-related human biomechanical data, foot pressure data, EMG data, and satisfaction data for each height of a heel of the tilting controller; b) extracting quantitative data of tilting conditions optimized according to a foot shape through machine learning based on the raw data; c) acquiring personal information of a user, and foot-related human biomechanical data that includes at least one of a foot straight line length, a ball width of the foot, a height of the top of the foot, medial and lateral longitudinal arches, and a straight line length of the ball of the foot by image-processing a foot image; and d) deriving last information to which a tilting value that is the most similar information from quantitative data through a matching algorithm based on the personal information and the foot-related human biomechanical data of the user, and recommending the derived last information.

In addition, the a) may include setting a tilting condition according to a foot pressure measurement algorithm by being connected with a plurality of tilting controllers arranged in parallel with each other and then extracting the foot pressure data at a time that the left foot weight and the right foot weight are balanced.

In addition, the b) may include extracting one of input parameters of a tilting condition for each heel height, a foot pressure sum, a foot pressure average, a foot pressure standard deviation, a number of pressure sensors (cells) for measuring foot pressure, a foot pressure ratio of the front foot portion mechanism and the rear foot portion mechanism, EMG similarity (similarity to flat-level EMG), foot comfort satisfaction, and a degree of foot tilt, and performing machine learning.

In addition, the d) may include a fitting service that displays a gap as an image by overlapping the last information and the user's foot data.

Meanwhile, according to one aspect of the present invention, a computer readable recording medium is provided. In the computer readable recording medium, a program for implementing a method for offering user-customized last information is recorded, and the method for offering user-customized last information includes: a) generating raw data by accumulating qualitative data that matches a subject's personal information, foot-related human biomechanical data, foot pressure data, EMG data, and satisfaction data for each height of a heel of the tilting controller; b) extracting quantitative data of tilting conditions optimized according to a foot shape through machine learning based on the raw data; c) acquiring personal information of a user, and foot-related human biomechanical data that includes at least one of foot straight line length, a ball width of the foot, a height of the top of the foot, medial and lateral longitudinal arches, and a straight line length of the ball of the foot by image-processing a foot image; and d) deriving last information to which a tilting value that is the most similar information from quantitative data through a matching algorithm based on the personal information and the foot-related human biomechanical data of the user, and recommending the derived last information.

The present invention provides a tilting controller for measuring foot-related human biomechanical data, and the tilting controller includes: a mechanism portion provided with a foot hold where a rear foot portion or a front foot portion is placed; and a control module that tilts the foot hold at a desired angle by controlling the mechanism portion.

The present invention provides a tilting controller for measuring foot-related human biomechanical data, and the tilting controller includes: a mechanism portion provided with a foot hold where a rear foot portion or a front foot portion is placed; and a control module that adjusts a height of the foot hold by controlling the mechanism portion.

The present invention provides a tilting controller for measuring foot-related human biomechanical data, and the tilting controller includes: a mechanism portion provided with a foot hold where a rear foot portion or a front foot portion is placed; and a control module that controls rotation of the foot hold by controlling the mechanism portion.

The mechanism portion preferably includes a sensor that measures foot pressure data or foot-related human biomechanical data of a subject.

The foot hold where the rear foot portion is placed may have a portion on which a foot is placed curved The tilting controller may be provided as a pair such that the left foot and the right foot are respectively placed.

The control module may be connected with a plurality of tilting controllers that are arranged in parallel with each other and may extract foot pressure data at a time that weights of both feet of a subject are balanced.

The control module may measure EMG data from an EMG sensor at a time that the left foot and the right foot are weight-balanced.

The control module may control the mechanism portion such that the foot hold is tilted in at least one of front, rear, left, right, and rotation directions.

The mechanism portion may have a structure in which the foot hold, on which the rear foot portion is placed, is tilted while adjusting a height or rotation of the foot hold.

According to an exemplary embodiment of the present invention, there is an effect of collecting qualitative data according to various body conditions and foot shapes of a subject and quantifying it through machine learning to provide personalized data of foot-related human biomechanical data.

In addition, there is an effect that a user can purchase footwear with improved comfort through an online store without having to try on footwear directly by providing data of foot-related human biomechanical data.

In addition, by providing a differentiated customized service that is produced and sold based on last information, there is an effect of reducing exchange and cancellation costs due to the size problem of ready-made footwear and improving customer satisfaction and reliability.

BRIEF DESCRIPTION OF THE DRAWINGS

FIG. 12 shows the raw data and the attribute information stored in the DB according to an embodiment of the present invention.

DETAILED DESCRIPTION OF THE EMBODIMENTS

Figure 1:
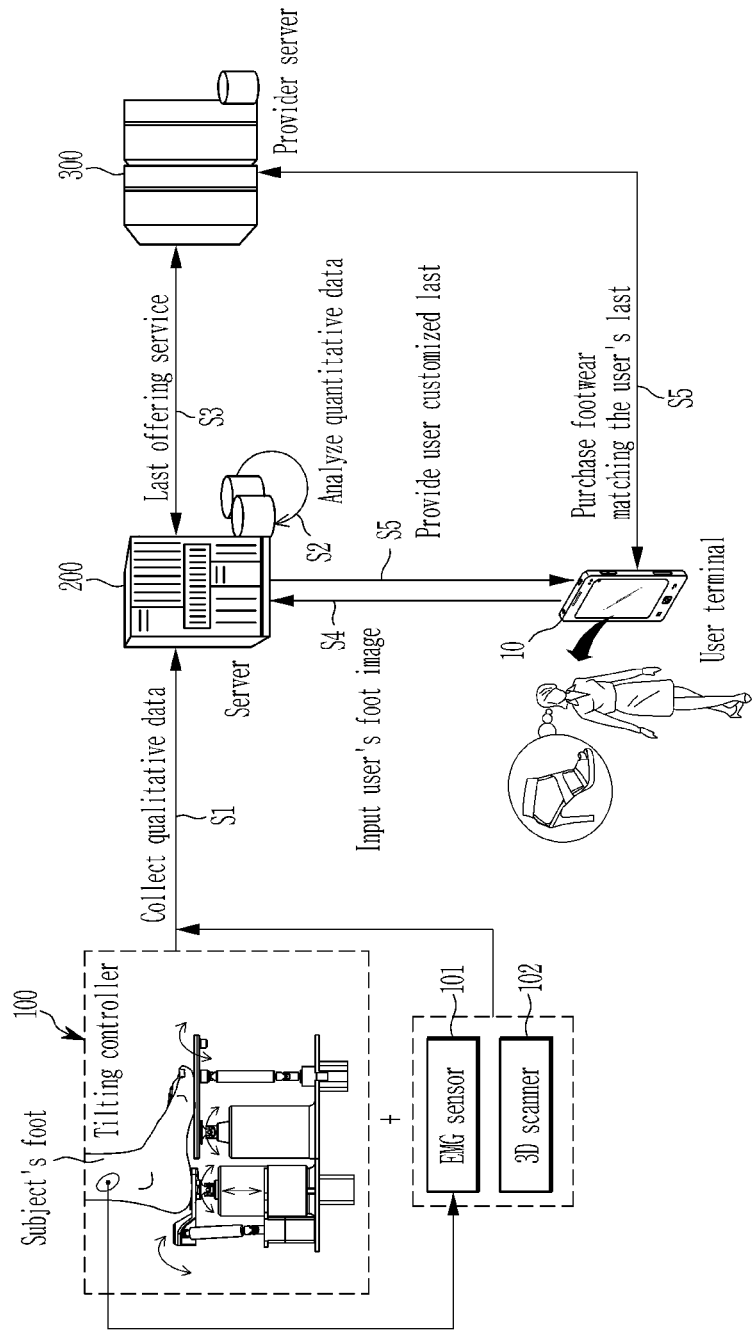
FIG. 1 schematically shows a configuration of a user-customized last management system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "comprise", and variations such as "comprises" or "comprising" will be understood to imply the inclusion of stated elements but not the exclusion of any other elements. In addition, the terms "-er", "-or", and "module" described in the specification mean units for processing at least one function and operation, and can be implemented by hardware components or software components, and combinations thereof.

In the entire specification, a person who was recruited and participated in a test to collect data for creation of a customized last is called a "subject" and a footwear buyer to receive the customized last service is called a "user".

Hereinafter, a user-customized last management system according to an exemplary embodiment of the present invention, and a method therefor, will be described in detail with reference to the accompanying drawings.

FIG. 1 schematically shows a configuration of a user-customized last management system according to an exemplary embodiment of the present invention.

Referring to FIG. 1, a network including a user-customized last management system according to an exemplary embodiment of the present invention includes a tilting controller 100, a server 200, a provider server 300, and a user terminal 10 is illustrated.

The tilting controller 100 measures data of foot pressure applied to a sole according to a tilting condition in a state where a subject steps thereon. The foot pressure data implies pressure distribution measured by disposing a plurality of pressure sensors in a cell format on footholds of a front foot portion and a rear foot portion of the sole, and measuring pressure distribution of the sole according to height adjustment of the front foot portion and the rear foot portion and front, rear, left, and right tilting conditions.

Meanwhile, three dimensional movement of a foot sole will now be described.

Figure 2A:
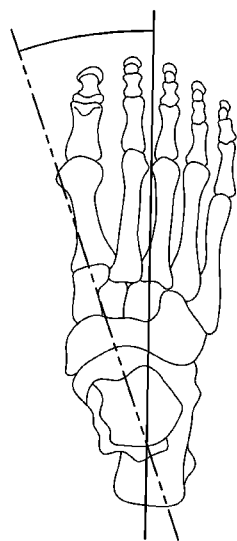
FIG. 2A shows an axis of subtalar joint when foot bones are viewed from the top.
Figure 2B:
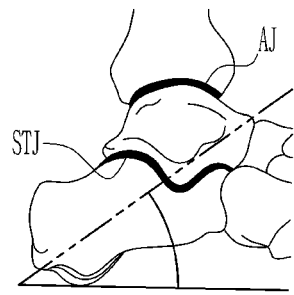
FIG. 2B is a side view of the axis of subtalar joint (STJ) that is tilted when viewed from a side.
Figure 2C:
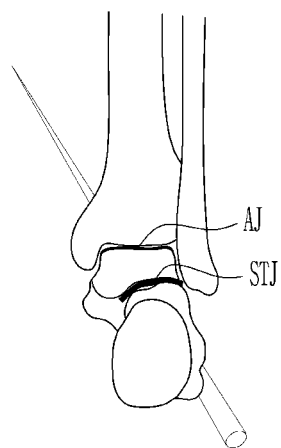
FIG. 2C is a three dimensional back view of the tilted axis of the subtalar joint.
Figure 3A:
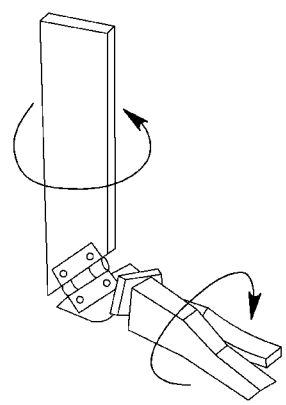
FIGS. 3A, 3B, 3C, and 3D are a view of simplifying the subtalar joint with a metered hinge joint, which shows that movements of a foot and a leg are coupled with reference to the subtalar joint.
Figure 3B:
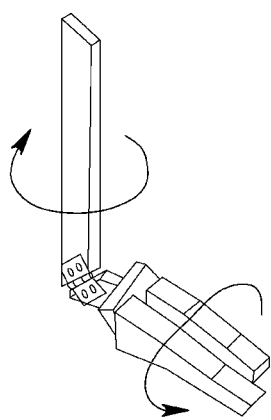
Figure 3C:
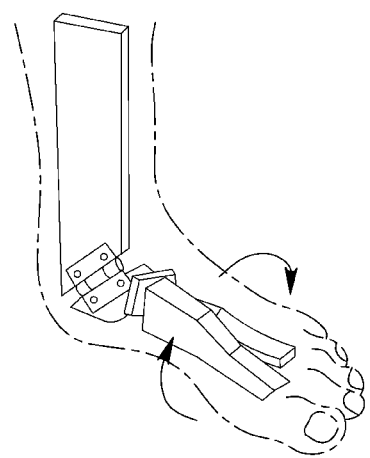
Figure 3D:
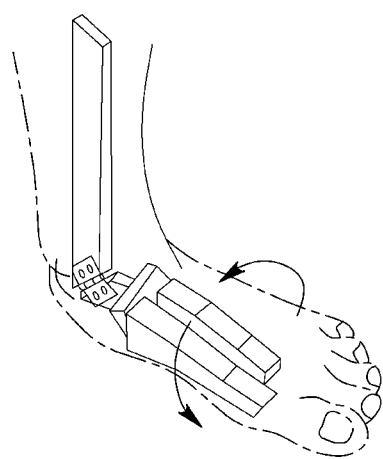

FIG. 2A shows an axis of subtalar joint when foot bones are viewed from the top, FIG. 2B is a side view of the axis of subtalar joint that is tilted when viewed from a side, and FIG. 2C is a three dimensional back view of the tilted axis of the subtalar joint.

FIGS. 3A, 3B, 3C, and 3D are a view of simplifying the subtalar joint as a metered hinge joint, which shows that movement of a foot and a leg are coupled with reference to the subtalar joint.

Figure 4A:
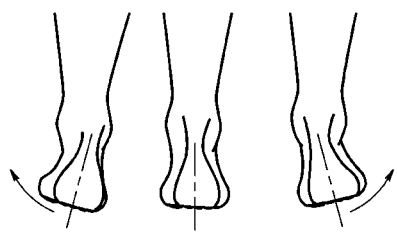
FIG. 4A shows foot rotation in a vertical plane running from front to back.
Figure 4B:
FIG. 4B shows foot rotation in a vertical plate running from side to side.
Figure 4C:
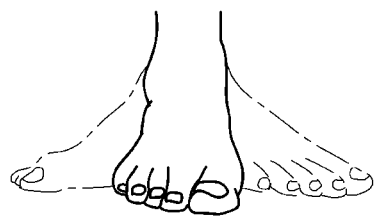
FIG. 4C shows foot rotation in the horizontal plane.

FIG. 4A shows foot rotation in a vertical plane running from front to back, FIG. 4B shows foot rotation in a vertical plane running from side to side, and FIG. 4C shows foot rotation in the horizontal plane.

In motions such as standing up, walking, running, and the like, the human weight is loaded to the ground through feet.

Simultaneously, reaction force is applied to the human body from the ground. Such action and reaction forces not only affect motion of a subtalar joint and an ankle joint but also affect motion of portions of the human body, which are located above the feet, such as a hip, pelvis, spine, and the like.

In particular, as shown in FIGS. 2A, 2B, and 2C, the subtalar joint (STJ) is a joint located below the ankle joint (AJ) and acts as a metered hinge joint such that triplanar movement is generated. Three-dimensional rotation consists of rotations in the horizontal plane, vertical plane running from front to back, and vertical plane running from side to side.

Accordingly, the motion in the subtalar joint triggers the three-dimensional rotation of the foot as shown in FIGS. 4A, 4B, and 4C.

As shown in FIGS. 3A, 3B, 3C, and 3D, movement of a toe side (foot) and movement of a body center side (leg) are generated while being coupled to each other. That is, three-dimensional rotation of a foot, i.e., a foot sole is coupled with movement of a portion of the human body, located above the foot.

Accordingly, movements of the human body, such as movements of the hip, pelvis, and spine can be modulated by adjusting the three-dimensional rotation of the foot sole In general, when standing on a flat surface without wearing footwear, the weight is evenly distributed on the sole, but the higher the heel of the footwear, the more the user's weight is shifted to the front foot portion of the front of the foot. In addition, depending on the shape of the user's feet, the weight tends to be inward or outward on the knee.

Therefore, it is desirable to distribute the weight evenly over the sole in consideration of the shape of the user's foot in order to secure the user's comfort when manufacturing footwear with high heels.

Thus, the tilting controller 100 may measure foot pressure data according to a foot pressure measurement algorithm where left/right tilting of the front foot portion, left/right tilting of the rear foot portion, front/rear tilting, and rotation conditions are set differently while controlling a height of a heel of the rear foot portion for each stage (hereinafter, the symbol "/" in the description implies "OR").

Based on the foot pressure data, test information that can derive a tilting condition in which the weight is distributed evenly according to the subject's foot shape can be provided.

In the exemplary embodiment of the present invention, the tilting controller is a device that measures foot-related human biomechanical data that determines wearing comfort.

The server 200 makes a database with an optimal last model based on foot shapes of various subjects according to the exemplary embodiment of the present invention to form a service platform that provides customized-last information according to a foot shape of a user derived from the DB.

Such a last information providing method of the server can be carried out by each stage as follows.

The server 200 collects qualitative data according to measurement of body conditions and foot pressures of various subjects (S1), and extracts quantitative data of a tilting condition optimized for comfort according to the foot shape through machine learning using the qualitative data as input information (S2).

In this case, the server 200 may build big data (DB) by generating last models according to various physical conditions based on the quantitative data.

Here, the last implies a tool (mold) having a fool shape, which becomes a base for footwear manufacturing. The last is the most important part of making footwear because it determines a shape of footwear and wearing comfort, and the design development of footwear starts from the last, and all other constituent elements such as outsoles and heels are produced according to the last.

Therefore, a customized footwear can be manufactured based on last information built in the DB of the server 200, and it is possible to improve the user's sense of wearing by making ready-made uniformized footwear with an existing size according to the last information considering the user's physical condition.

For example, the server 200 may provide a last information service for providing last information built in the DB to a provider server 300 that manufactures/sells footwear (S3).

In addition, when a foot image of a user is input from the user terminal 10 who purchases footwear, the server 200 analyzes the foot image and extracts foot-related human biomechanical data (S4). In addition, an optimized last information service can be provided such that optimized last information of a user can be derived by extracting the quantitative data that matches the foot-related human biomechanical data and then the extracted data can be provided to the user (S5).

Next, in the provider server 300 manufactures footwear based on the last information, and the user may purchase footwear that matches the user's last through an on-line/off-line store. Thus, footwear is purchased through personalized last information according to the user's own foot-related human biomechanical data, not the selection of footwear considering only the existing uniform size, so it is possible to purchase footwear with improved comfort without trying it.

A configuration of the user-customized last management system according to the exemplary embodiment of the present invention will be described in more detail with reference to the following drawings.

Figure 5:
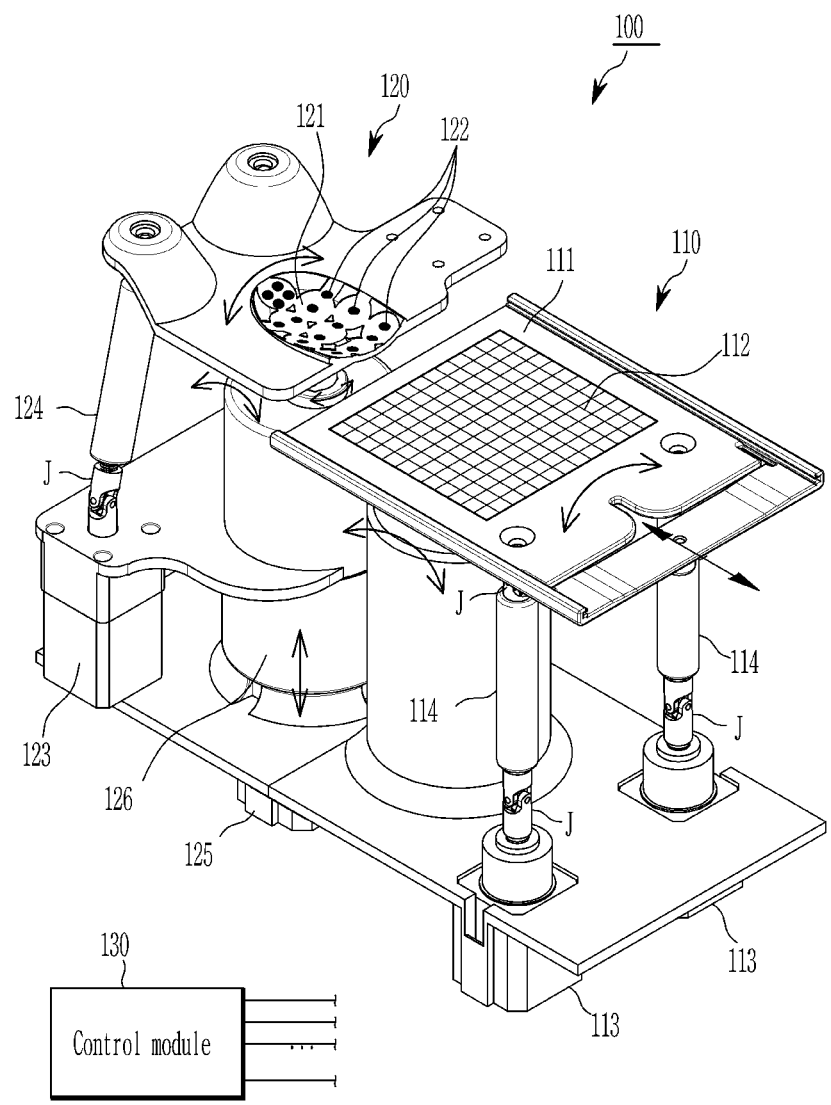
FIG. 5 is a perspective view of the tilting controller according to the exemplary embodiment of the present invention.

FIG. 5 is a perspective view of the tilting controller according to the exemplary embodiment of the present invention.

Figure 6A:
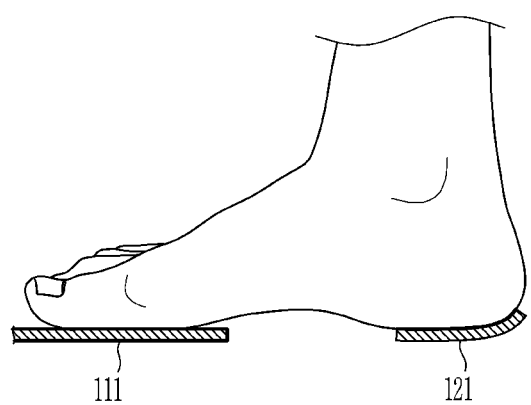
FIGS. 6A and 6B exemplarily show step-by-step height and tilting adjustment according to the exemplary embodiment of the present invention.
Figure 6B:
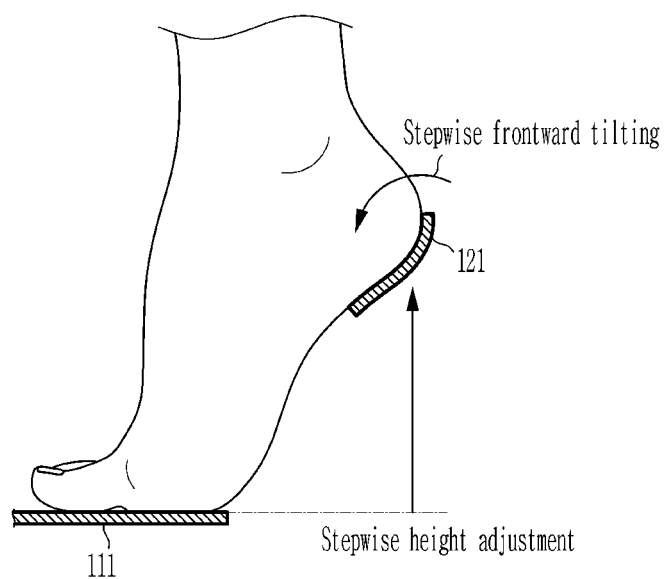

FIGS. 6A and 6B exemplarily show step-by-step height and tilting adjustment according to the exemplary embodiment of the present invention.

Referring to FIG. 5 and FIGS. 6A and 6B, the tilting controller 100 according to the exemplary embodiment of the present invention includes a first mechanism portion 110 where a front foot portion (a front portion of the foot) of the subject is mounted, a second mechanism portion 120 where a rear foot portion (a rear portion of the foot) of the subject is mounted, and a control module 130 that controls operation of each portion for measurement of foot pressure data of the subject. The control module 130 includes drivers for individual kinematic control of the first mechanism portion 110 and the second mechanism portion 120.

In the first mechanism portion 110, a first pressure sensor 112 is disposed on a top surface of a first foothold 111 where the front foot portion is held, and the first foothold 111 is tilted in front/rear and left/right directions by using two motors 113 and two first support shafts 114 connected to left and right lower portions of the first foothold 111.

Joints are formed at opposite ends of each of the first support shaft 114 such that the first foothold 111 can be tilted in the front, rear, left, and right directions.

The first pressure sensor 112 is provided as a force sensitive resistor (FSR)-type sensor where a plurality of sensors are arranged in column and row directions on a plane in consideration of a feature that the first foothold 111 where the front foot portion is held is flat and the front foot portion has a wire sole.

For example, the first pressure sensor 112 can measure the foot pressure data of the front foot portion using one FSR sensor composed of 160 cells of a width (7 mm)×length (7 mm) size.

In the second mechanism portion 120, a second pressure sensor 122 is disposed on a top surface of a second foothold 121, and the second foothold 121 is tilted in front/rear and left/right directions by using two motors 123 and two first support shafts 124 connected to left and right lower portions of the second foothold 121.

Joints are formed at opposite ends of each of the second support shaft 124 such that the second foothold 121 can be tilted in the front, rear, left, and right directions, and are the same as the joints of the first mechanism portion 110.

In addition, as shown in FIGS. 6A and 6B, the second mechanism portion 120 further includes a height adjusting motor 125 that adjusts a height of a heel by vertically moving the second foothold 121, and a rotation motor 126 that horizontally rotates the second foothold 121.

In this case, the second mechanism portion 120 of the rear foot portion additionally includes two motors such that the control module 130 can control a height and rotation of the heel, and a distance between the rear foot portion and the front foot portion according to a height change of the heel can be measured.

Here, the rotation motor 126 formed in the second mechanism portion 120 is replaced with the first mechanism portion 110 to rotate the first foothold 111 from side to side, and in this case, the rotation motor 126 of the second mechanism portion 120 can be omitted.

The second pressure sensor 122 measures the foot pressure data of the rear foot portion by arranging a plurality of PPS (electrostatic capacity) methods for the characteristic that the second foothold 121 is formed in a curved shape to fit the heel shape of the rear foot portion.

Through this, the second pressure sensor 122 can accurately measure the pressure applied along the curved surface of the heel of the foot even if the second foothold 121 is inclined due to the height adjustment of the heel.

Figure 7:
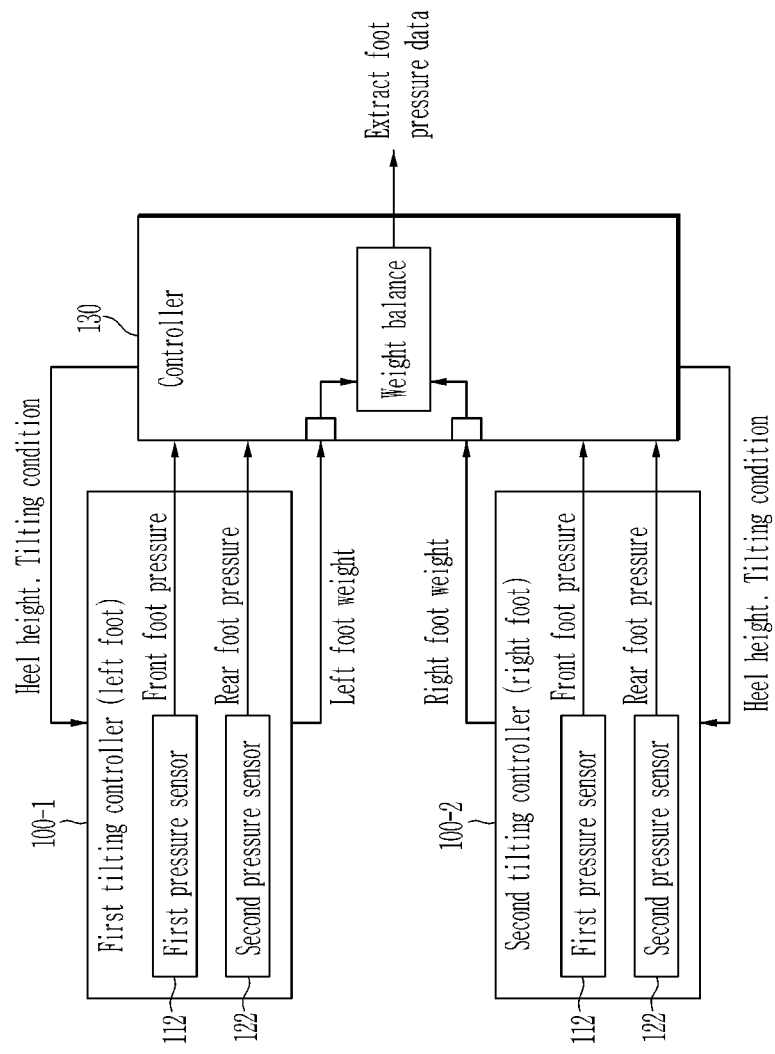
FIG. 7 shows a method for measuring foot pressure data of the subject by the controller of the tilting controller according to the exemplary embodiment of the present invention.

FIG. 7 shows a method for measuring foot pressure data of the subject by the controller of the tilting controller according to the exemplary embodiment of the present invention.

Referring to FIG. 7, it is very important to balance weights of both feet of the subject for reliable data extraction in the foot pressure data measurement method using the tilting controller 100 according to the exemplary embodiment of the present invention.

Thus, as shown in FIG. 7, a plurality of first tilting controllers 100-1 and second tilting controllers 100-2 are connected to the control module 130 while being arranged in parallel with each other, and foot pressure data is extracted only when the weights of both feet are balanced while the subject is on the tilting controllers 110-1 and 100-2 with the left and right feet.

In further detail, the control module 130 stepwise controls at least one tilting condition of front/rear and left/right control of the front foot portion for each height of the heel and front/rear and left/right rotation of the rear foot portion, and a distance with the front foot portion according to a predetermined foot pressure measurement algorithm.

The control module 130 regards outputs of a front foot pressure and a rear foot pressure according to the tilting condition as invalid when the left foot weight and the right foot weight are not balanced.

Therefore, the control module 130 automatically captures the foot pressure data output when the left foot weight and the right foot weight achieve a weight balance in the predetermined state of the tilting condition to thereby extract the front foot portion pressure and rear foot portion pressure. That is, the control module 130 may automatically extract foot pressure data at the time when the weight ratio is the same for both feet and match the corresponding tilting condition.

In addition, the control module 130 may measure the EMG data from the EMG sensor 101 when the left foot weight and the right foot weight are balanced.

For this, the control module 130 may also interact with an EMG sensor 101.

For example, the EMG sensor 101 may be provided as a wireless type of surface EMG (FREE EMG 1000, BTS), and after attaching a patch for receiving eight EMGs to the subject's lower extremity, EMG data according to the degree of muscle contraction in the tilting condition can be measured.

Figure 8:
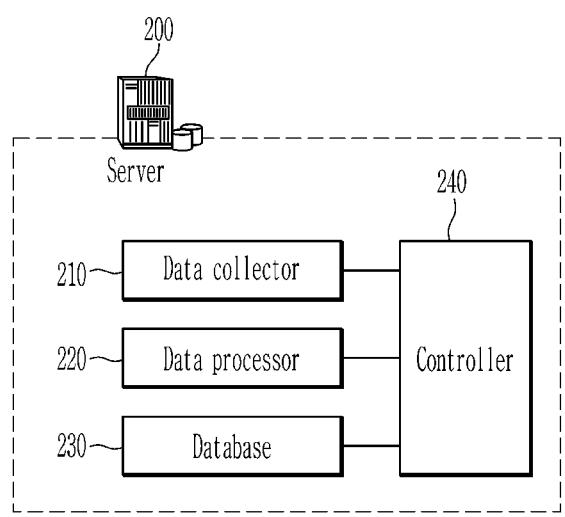
FIG. 8 is a schematic block diagram of a server according to the exemplary embodiment of the present invention.

FIG. 8 is a schematic block diagram of a server according to the exemplary embodiment of the present invention.

Referring to FIG. 8, the server 200 according to the exemplary embodiment of the present invention includes a data collector 210, a data processor 220, a database (DB) 230, and a controller 240.

The data collector 210 includes an interface capable of transmitting and receiving data with an external device and collects qualitative data according to the subject's physical condition, and the qualitative data is divided into objective data and subjective data.

The objective data may be subject's personal information, foot-related body information, subject's foot pressure data, electromyogram, 3D foot scan data, and the like.

The subjective data are the subject's foot comfort satisfaction and foot tilt data according to the various heights and tilting conditions of the tilting controller 100. The subjective data is entered into a numerical value or ratio according to each degree by questioning the subject under a predetermined test condition through height and tilting control of the tilting controller 100.

The reason for collecting qualitative data is to increase the size of the population from the extraction of quantitative data using a machine learning method to extract qualitative and reliable quantitative data. Here, the quantitative data may be defined as valid reference information that is the basis for deriving the last information that matches the user's personal information and foot-related body information.

Therefore, the data collector 210 can collect qualitative data at various heights and tilting conditions as subjects of various conditions to improve reliability of the last information.

Figure 9:
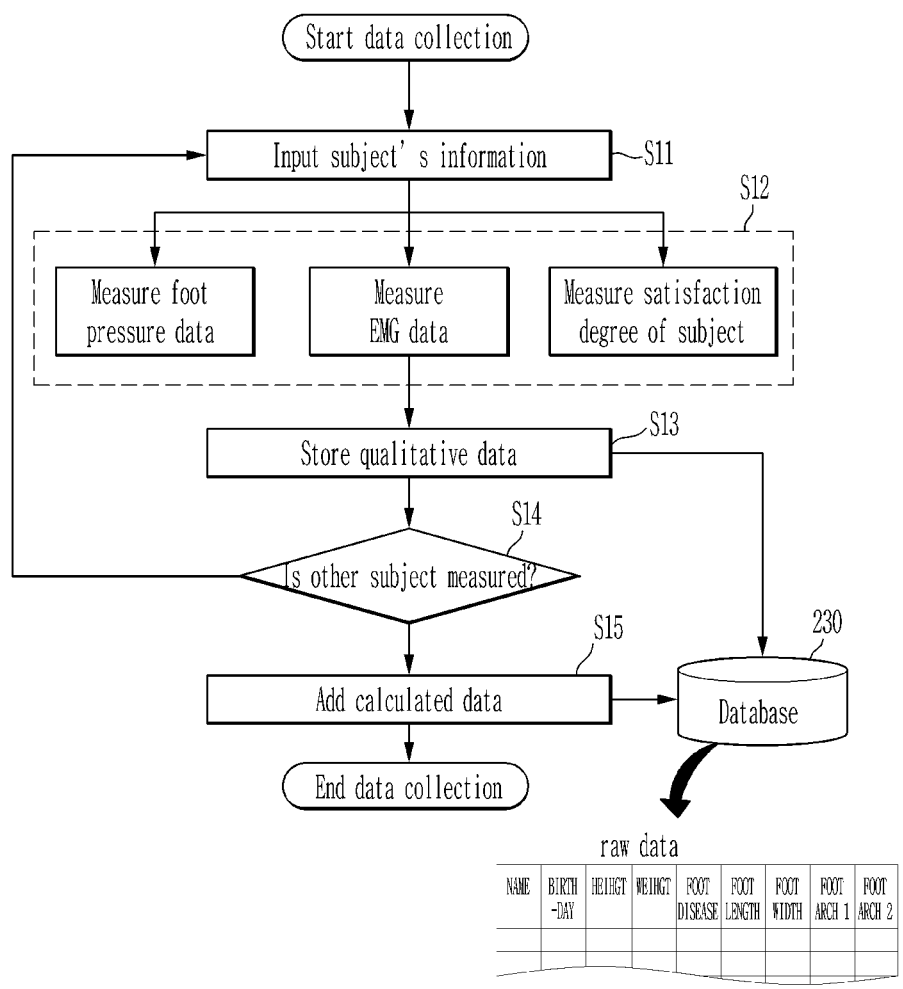
FIG. 9 schematically shows a qualitative data collection method according to the exemplary embodiment of the present invention.

FIG. 9 schematically shows a qualitative data collection method according to the exemplary embodiment of the present invention.

Figure 10:
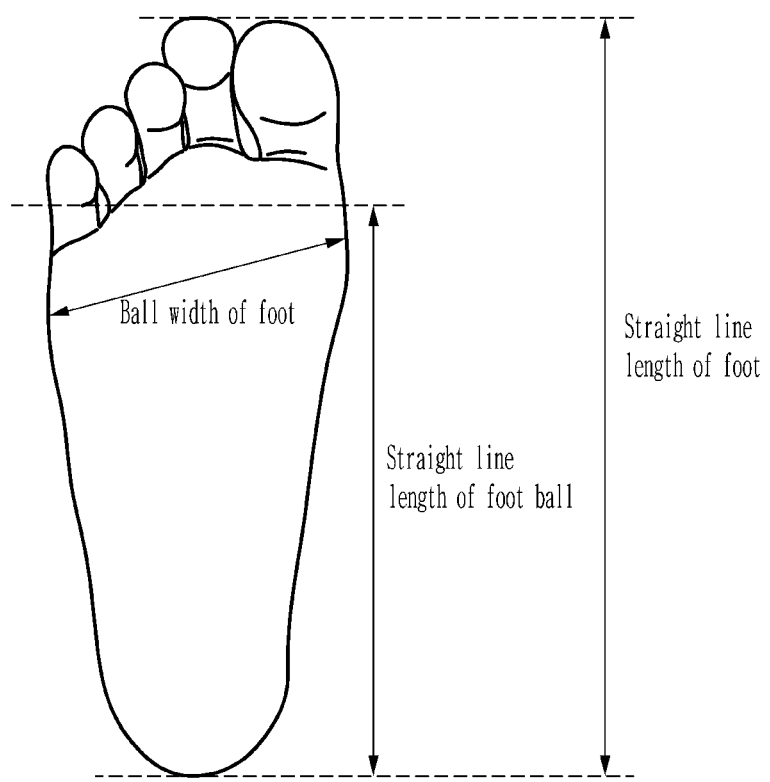
FIG. 10 and FIG. 11 show subject's foot-related human biomechanical data according to the exemplary embodiment of the present invention.
Figure 11:
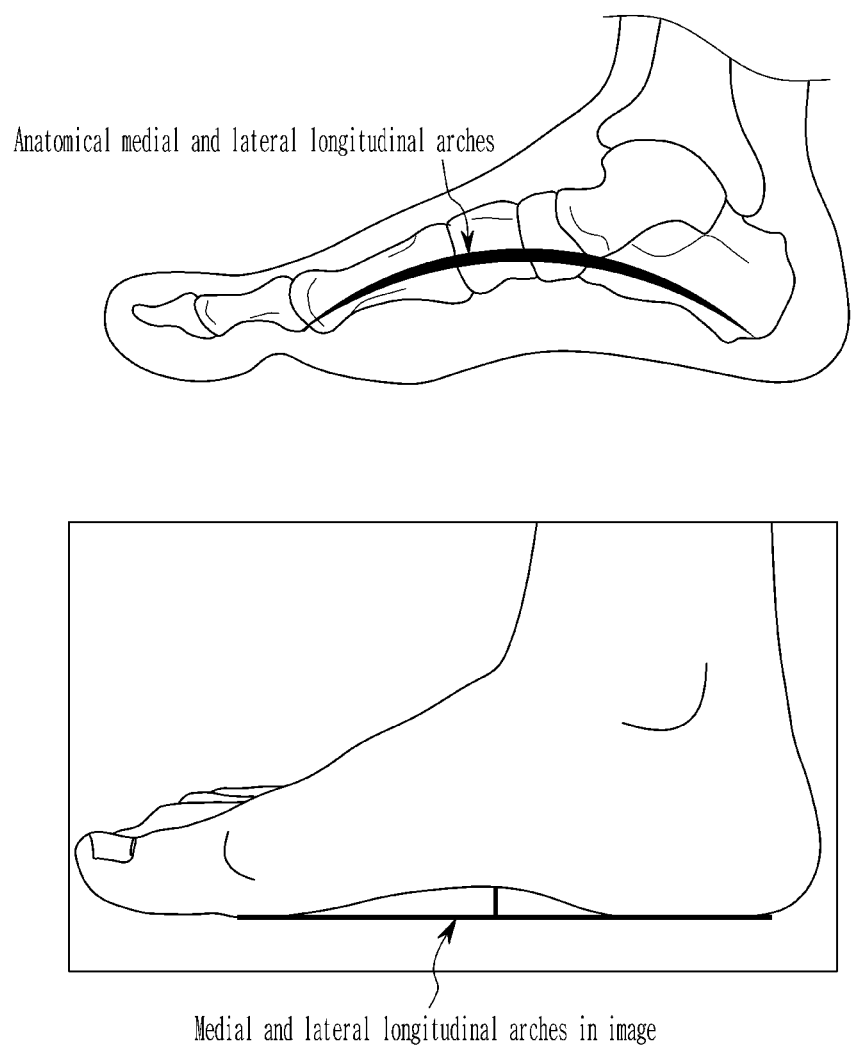

FIG. 10 and FIG. 11 show subject's foot-related human biomechanical data according to the exemplary embodiment of the present invention.

Referring to FIG. 9 to FIG. 11, the data collector 210 according to the exemplary embodiment of the present invention collects subject information when starting collection of qualitative data (S11).

In this case, the data collector 210 can acquire personal information including the subject's name, date of birth, height, body weight, and presence or absence of foot disease history, and as FIG. 10 and FIG. 11, foot-related human biomechanical data including a foot straight line length (mm), a ball width of the foot (mm), medial and lateral longitudinal arches, and a straight line length (mm) of the ball of the foot.

In this case, the foot-related human biomechanical data may further measure 3D foot scan data, which is the entire scan of the subject's foot shape through a 3D scanner 102, for the tilting controller 100, and extract it from the 3D foot scan data.

The data collector 210 collects foot pressure data, EMG data, and subject satisfaction data for each tilting condition for each subject's heel (rear foot portion) height from the tilting controller 100 and EMG sensor 101 (S12).

The data collector 210 generates a piece of qualitative data that matches the subject's personal information, foot-related human biomechanical data, foot pressure data, EMG data, and satisfaction data for each height of the heel and stores it in the database 230 (S13).

The qualitative data obtained from the subjects are accumulated as raw data in the database 230.

For example, FIG. 12 shows the raw data and the attribute information stored in the DB according to an embodiment of the present invention Referring to FIG. 12, the raw data according to the exemplary embodiment of the present invention may be formed of a user information table (User Info TABLE) and a user data (sensing_EMG) table (User Data TABLE).

The user information table is formed of personal information and foot-related human biomechanical data of a subject, and these attributes are used to identify a user through a matching algorithm of user information requested for service in a user's last recommendation service, which will be described later, and data stored in the database 230.

In addition, the user data (sensing_EMG) table is formed of foot pressure data, EMG data, and subject's foot comfort satisfaction, and these attributes are utilized as basic data for quantitative data extraction.

In order to measure subject's a foot comfort satisfaction degree (1 to 100 points) and foot tilt data (1 to 100 points), evaluation data of the subject with respect to each tilting condition is collected.

In the above description, raw data according to the exemplary embodiment of the present invention is not limited to being composed of two tables, but may be composed of one integrated Excel table.

Meanwhile, the data collector 210 returns to step S11 when there is another subject measurement (S14; YES), and repeats the process of collecting qualitative data.

On the other hand, when there is no other subject measurement (S14; No), the data collector 210 determines that the collection of qualitative data through the subjects is completed.

In this case, the data collector 210 acquires foot pressure data for all tilting conditions for each height of the heel using the tilting controller 100 for each subject, and then calculates a foot pressure sum, a foot pressure average, a foot pressure standard deviation, a number of pressure sensors (cells) with which foot pressure is measured, and foot pressure ratios of the front foot portion mechanism and the rear foot portion mechanism from foot pressure data and adds them to the raw data of the DB 230 (S15).

In this case, the data collector 210 compares the EMG measured for each foot pressure data measurement condition compared to the reference EMG (e.g. 100%) when the subject stands upright on a flat surface through the EMG sensor 101, and may further add a degree of similarity (e.g., a likelihood ratio) to the raw data of DB 230. The reason for further measuring the EMG is to obtain objective information in which the subject feels comfortable, and the more the contraction of the lower extremity muscle for each measurement condition is similar to the reference EMG, the more comfortable the subject feels.

The data processor 220 performs machine learning based on the qualitative data contained in the raw data to generate quantitative data of tilting conditions in which comfort according to a foot shape is optimized.

The quantitative data implies the most comfortable tilting angle of a front feet portion and a rear feet portion in a combination of at least one of a heel height, a foot straight line length, a ball width of the foot, a height of the top of the foot, medial and lateral longitudinal arches, and a straight line length of the ball of the foot (mm).

For this, the data processor 220 may build a quantitative data generation model based on a multi-layered neural network using a machine learning engine.

The data processor 220 extracts input parameters necessary for learning from raw data and inputs it to the machine learning engine.

The input parameters for the learning may include a tilting condition for each heel height, a foot pressure sum, a foot pressure average, a foot pressure standard deviation, a number of pressure sensors (cells) for measuring foot pressure, a foot pressure ratio of the front foot portion mechanism and the rear foot portion mechanism, EMG similarity (similarity to flat-level EMG), foot comfort satisfaction, and a degree of foot tilt.

In this case, the input parameters can be selectively extracted according to the type of customized footwear (e.g., general shoes, sneakers, high-heeled footwear, etc.), and weight values may be assigned for each parameter according to importance.

The database 230 stores various programs and data for providing a user-customized last according to the exemplary embodiment of the present invention, and stores data generated according to the operation of the server 200.

The database 230 stores raw data generated by the accumulation of qualitative data, stores quantitative data processed by learning raw data, and stores and manages 3D last model information optimized according to the stored information.

The controller 240 is a central processing unit that controls the overall operation of the parts for the operation of the server 200 according to the exemplary embodiment of the present invention.

The controller 240 generates 3D last information in consideration of various foot-related physical conditions based on the quantitative data. The 3D last information includes last information optimized for tilting conditions for each heel height, matched with 3D foot scan data.

The controller 240 may output (produce) the actual last through 3D printing using the 3D last information.

In addition, the controller 240 may collect information and foot-related human biomechanical data of a user who wants to purchase footwear and provides customized 3D last information based on the quantitative data.

Figure 13:
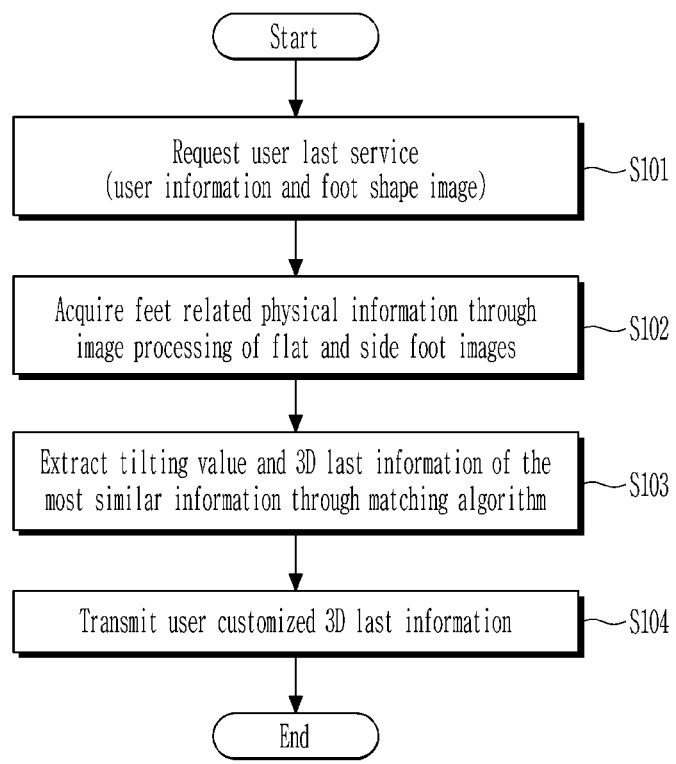
FIG. 13 is a schematic flowchart of a user-customized last offering service method according to the exemplary embodiment of the present invention.

For example, FIG. 13 is a schematic flowchart of a user-customized last offering service method according to the exemplary embodiment of the present invention.

Referring to FIG. 13, the controller 240 according to the exemplary embodiment of the present invention receives user information and a foot shape image according to an optimized last service request from the user terminal 10 (S101). The user information includes birth dates, heights, and weights, and the foot shape image includes a flat and side image of the foot. In this case, the received information may be collected through an application (APP) of the user terminal 10.

The controller 240 acquires foot-related human biomechanical data including a foot straight line length, a ball width of the foot, a height of the top of the foot, medial and lateral longitudinal arches, and a straight line length of the ball of the foot (mm) by analyzing the collected flat and side images of the foot through image processing (S102).

The controller 240 extracts a tilting value and 3D last information that are the most similar information from quantitative data through a matching algorithm based on user information and foot-related human biomechanical data (S103).

The controller 240 recommends 3D last information to which the tilting value optimized for the user's foot shape is applied by transmitting the 3D last information to the user terminal 10 (S104).

In this case, the controller 240 may derive tilting values of the front foot portion and the rear foot portion optimized for each heel height according to the user's foot shape and the last information according to the tilting value. Therefore, when a heel height of a user-desired condition is input, last information corresponding to the input can be recommended.

On the other hand, in the user-customized last offering service method, the controller 240 may not only recommend the 3D last information to the user, but may also provide a fitting service in an APP environment by utilizing the 3D last information.

Figure 14:
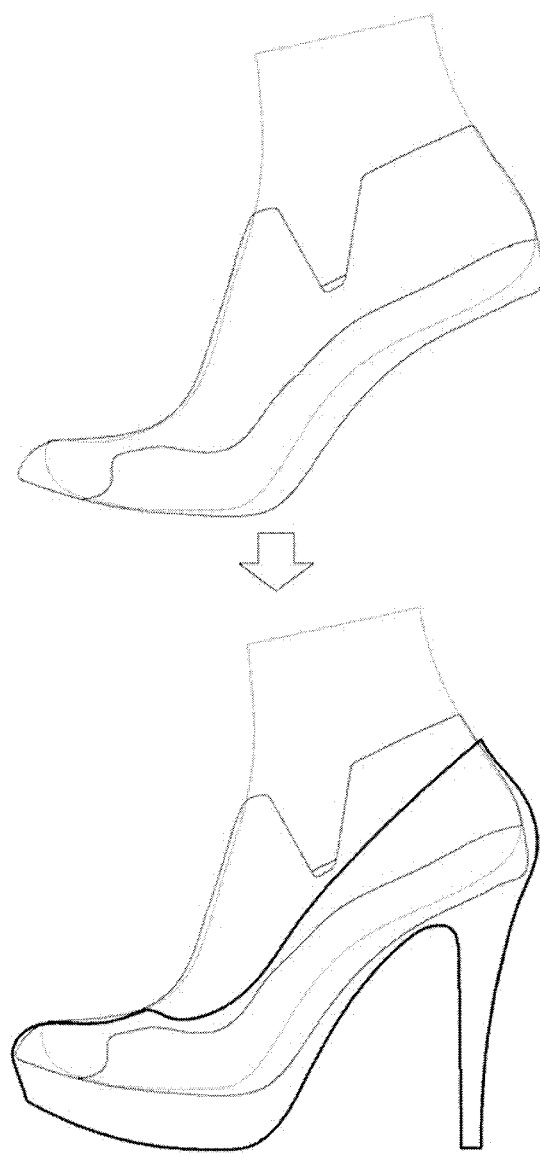
FIG. 14 exemplarily illustrates a fitting service according to the exemplary embodiment of the present invention.

For example, FIG. 14 exemplarily illustrates a fitting service according to the exemplary embodiment of the present invention.

Referring to FIG. 14, the controller 240 according to the exemplary embodiment of the present invention may provide a fitting service that displays a gap as an image by overlapping the 3D last information and the user's 3D foot data. Here, the user's 3D foot data may utilize the most similar 3D foot scan data of a subject derived from quantitative data through the matching algorithm.

In the above description, the user-customized last offering method according to the exemplary embodiment of the present invention has been described as the data collector 210, the data processor 220, and the controller 240 as each subject, but since it can be integrated into one server 200, the server 200 may be described as a subject in each step of the method.

As described, according to the exemplary embodiment of the present invention, there is an effect of collecting qualitative data according to various body conditions and foot shapes of the subject and quantifying it through machine learning to provide personalized and customized last information.

In addition, by providing customized last information, there is an effect that a user can purchase footwear with improved comfort through an online store without having to try on footwear directly.

Further, by providing a differentiated customized service that is produced and sold based on last information, there is an effect of reducing exchange and cancellation costs due to the size problem of ready-made footwear and improving customer satisfaction and reliability.

Although the exemplary embodiment of the present invention has been described above, the present invention is not limited to the exemplary embodiment described above, and various other modifications are possible.

For example, in view of the above-described contents, the user-customized last offering service method according to the exemplary embodiment of the present invention can be sufficiently utilized not only in customized footwear but also in ready-made footwear.

Through this, the user can purchase footwear made of the most comfortable jig for their feet even if they do not try out the footwear directly, and can solve the problem of purchasing footwear in the online distribution.

In addition, in the exemplary embodiment of the present invention shown in FIG. 10, last information is provided according to a user's request, but this is not restrictive, and last information can also be offered according to a request of the provider server 300 of a provider who produces/sells footwear as shown in FIG. 1 for utilization in manufacturing of ready-made footwear.

For example, the provider server 300 may request user information and a foot shape image collected through a menu in a footwear sales site to the server 200, and may sell footwear by recommending the right footwear that matches the user's last with user last information analyzed by the server 200.

In addition, in order to sell footwear that matches the last information to a user who received the last information from the server 200, the last information must be secured and footwear must be produced accordingly.

Therefore, the server 200 can build a business model that enables a business operator to make and sell a ready-made product suitable for the user's last information by sharing or selling the last information stored in the DB in a contract with the business operator.

The exemplary embodiments of the present invention are not implemented only through the apparatus and/or method described above, but may be implemented through a program for implementing functions corresponding to the configuration of the exemplary embodiment of the present invention, a recording medium on which the program is recorded, and the like, and the present invention can be easily implemented by those skilled in the art from the description of the exemplary embodiments described above.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A tilting controller for measuring foot-related human biomechanical data, comprising:
   a mechanism portion provided with a foot hold where a rear foot portion or a front foot portion is placed; and
   a control module that tilts the foot hold at a desired angle by controlling the mechanism portion,
   wherein the mechanism portion includes actuators that tilt the foothold in the left and right direction where the rear foot portion is placed, and
   wherein the control module controls the actuators to tilt the foothold in the left and right direction where the rear foot portion is placed and collects human biomechanical data of a subject that varies according to the distribution of the subject's weight.

2. The tilting controller for measuring foot-related human biomechanical data of claim 1, wherein the mechanism portion comprises a sensor that measures foot pressure data or foot-related human biomechanical data of a subject.

3. The tilting controller for measuring foot-related human biomechanical data of claim 1, wherein the foot hold where the rear foot portion is placed has a curved surface.

4. The tilting controller for measuring foot-related human biomechanical data of claim 1, wherein the tilting controller is provided as a pair such that the left foot and the right foot are respectively placed.

5. The tilting controller for measuring foot-related human biomechanical data of claim 1, wherein the control module is connected with a plurality of tilting controllers that are arranged in parallel with each other and extracts foot pressure data at a time that weights of both feet of a subject are balanced.

6. The tilting controller for measuring foot-related human biomechanical data of claim 1, wherein the control module measures EMG data from an EMG sensor at a time when the left foot and the right foot are weight-balanced.

7. The tilting controller for measuring foot-related human biomechanical data of claim 1,
   wherein the mechanism portion includes actuators that tilt the foothold in the up and down direction where the rear foot portion is placed, and
   wherein the control module controls the actuators to move the foothold in the left/right and up/down direction where the rear foot portion is placed and collects human biomechanical data of a subject that varies according to the distribution of the subject's weight.

8. The tilting controller for measuring foot-related human biomechanical data of claim 1,
   wherein the mechanism portion includes actuators that rotate the foothold in a horizontal plane direction where the rear foot portion is placed, and
   wherein the control module controls the actuators to rotate the foothold in the horizontal plane direction where the rear foot portion is placed and collects human biomechanical data of a subject that varies according to the distribution of the subject's weight.

9. The tilting controller for measuring foot-related human biomechanical data of claim 1,
   wherein the mechanism portion includes actuators that tilt the foothold in a left and right direction where a front foot portion is placed, and
   wherein the control module controls the actuators to tilt the foothold in the left and right direction where the front foot portion is placed and collects human biomechanical data of a subject that varies according to the distribution of the subject's weight.

* * * * *